(12) United States Patent  
Joung

(10) Patent No.: US 7,116,662 B2  
(45) Date of Patent: Oct. 3, 2006

(54) MULTI-LAYERED PACKET PROCESSING DEVICE

(75) Inventor: Jin-Woo Joung, Kunpo (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 690 days.

(21) Appl. No.: 09/899,531

(22) Filed: Jul. 6, 2001

(65) Prior Publication Data

US 2002/0057669 A1     May 16, 2002

(30) Foreign Application Priority Data

Sep. 27, 2000   (KR) .............................. 2000-56825

(51) Int. Cl.  
     *H04L 12/28*     (2006.01)  
     *H04J 3/24*     (2006.01)

(52) U.S. Cl. .................. 370/392; 370/395.52; 370/474

(58) Field of Classification Search ................ 370/352, 370/389, 392, 395.1, 395.52, 395.53, 395.54, 370/401, 469, 474, 473  
See application file for complete search history.

(56) References Cited

U.S. PATENT DOCUMENTS 5,903,559 A * 5/1999 Acharya et al. ....... 370/395.52

| | | | | |
|---|---|---|---|---|
| 6,122,670 A * | 9/2000 | Bennett et al. | ............. | 370/469 |
| 6,172,991 B1 * | 1/2001 | Mori | ........................... | 370/474 |
| 6,275,494 B1 * | 8/2001 | Endo et al. | ............ | 370/395.52 |
| 6,345,302 B1 * | 2/2002 | Bennett et al. | ............. | 709/236 |
| 6,466,976 B1 * | 10/2002 | Alles et al. | ................. | 709/224 |
| 6,633,563 B1 * | 10/2003 | Lin et al. | ..................... | 370/389 |
| 6,704,794 B1 * | 3/2004 | Kejriwal et al. | ............ | 370/392 |
| 6,757,249 B1 * | 6/2004 | Kejriwal et al. | ......... | 370/395.4 |

FOREIGN PATENT DOCUMENTS

| JP | 7-71111 A | 7/1995 |
|---|---|---|
| JP | 11-317783 A | 11/1999 |
| WO | WO 00/10357 A1 | 2/2000 |

OTHER PUBLICATIONS

Yasunori Sameshima, et al., "An Approach to Realizing Real-Time Packet Filter", Citation 2, ISSN 0913-5685, vol. 99, No. 595, Abstract.

* cited by examiner

*Primary Examiner*—Andrew C. Lee  
(74) *Attorney, Agent, or Firm*—Sughrue Mion, PLLC

(57) ABSTRACT

A multi-layered packet processing device using multiple processors for processing a received multi-layered packet at a hardware level. The multi-layered packet processing device includes an interface for transmitting a data packet to a node and receiving the data packet from the node through a public network; and a plurality of packet processing portions for sequentially processing the data packet, in a pipeline pattern, according to a header of the data packet transferred through the interface.

6 Claims, 5 Drawing Sheets

MULTI-LAYERED PACKET PROCESSING DEVICE

BACKGROUND OF THE INVENTION

1. Field of the Invention

The present invention relates to a multi-layered packet processing device, and more particularly to a multi-layered packet processing device for processing a received multi-layered packet at a high speed, by using multiple processors. The present application is based on Korean Patent Application No. 2000-56825, which is incorporated herein by reference.

2. Description of the Related Art

Based on a widely-known Open Systems Interconnection (OSI) reference model, a precondition for data communication within a network is that the data has to be transferred from a top layer to a bottom layer and from the bottom layer to the top layer. During the data transmission from the top layer to the bottom layer, a header containing information is added to the data, through a process called 'encapsulation'.

In the communication field, the term 'encapsulation' means inclusion of a data structure in another data structure. Until reaching a target destination, the data structure is hidden. For example, when a transmission control protocol/internet protocol (TCP/IP) type data packet is encapsulated in an asynchronous transfer mode (ATM) frame, which is transferred on a cell basis, the TCP/IP type data packet is only recognized as a bit stream among the ATM data.

Functions of the devices in the network include processing a header/trailer of the encapsulated data, such as validation, conversion, updating, etc. Here, the processing needs to be handled fast for high-speed communication. Additionally, the trailer includes information about data length and Cyclic Redundancy Check (CRC).

FIG. 1 is a view for explaining a conventional packet processing. When the data packet is transferred to a memory (1-3) via an input interface (1-1), a Central Processing Unit (CPU; 1-4) reads, analyzes, and processes the header information stored in the memory (1-3), and outputs the packet via an output interface (1-2).

According to conventional data packet processing, since the processes of accessing and processing various information of the header of the packet stored in the memory (1-3), and storing the data in the memory (1-3) have to be repeatedly performed, the packet handling efficiency is deteriorated, while a next packet is held in stand-by state in the memory (1-3).

Accordingly, the conventional central packet processing method is inefficient as it relates to a packet processing speed.

SUMMARY OF THE INVENTION

The present invention has been made to overcome the above-mentioned problems of the related art, and accordingly, it is an object of the present invention to provide a multi-layered packet processing device capable of handling a received multi-layered packet at a hardware level and at a high speed, by using multiple processors.

The above object is accomplished by a multi-layered packet processing device, according to the present invention, including an interface for transmitting and receiving a data packet with a node through a global network; and a plurality of packet processing portions for sequentially processing the data packet, in a pipeline pattern, according to a header of the data packet transferred through the interface.

BRIEF DESCRIPTION OF THE DRAWINGS

The above objects and other features and advantages of the present invention will become more apparent after a reading of the following detailed description in conjunction with the drawings, in which:

FIG. 4B is a flow chart for explaining the operation of the IP processor of FIG. 3;

DETAILED DESCRIPTION OF PREFERRED EMBODIMENT

The multi-layered packet processing device of the present invention will be described in greater detail below with reference to accompanying drawings.

The multi-layered packet processing device, according to the present invention, receives from a main module, via an interface, various types of packets which are encapsulated in ATM Adaptation Layer 5 (AAL5) protocol cell formats. The Table 1 below lists the types and formats of the packets.

TABLE 1

| General Classification | Description | Format |
|---|---|---|
| UMTS PLMN Core Network GGSN_incoming | Normal IP | IP(20) ǀ Payload |
| | Mobile IP (IP in IP) | MIP(20) ǀ IP(20) ǀ Payload |
| | Mobile IP (M in IP) | Modified IP(20) ǀ Min Header (8 or 12) ǀ Payload |
| | Mobile IP (Generic Routing Encapsulation(GRE)) Special UDP (Layer 2 Tunneling Protocol (L2TP), RADIUS, MIP registration, etc.) | IP ǀ UDP ǀ L2TP, etc. ǀ Payload |
| UMTS PLMN Core Network GGSN_outgoing or SGSN | Normal IP | IP (20) ǀ UDP (ignored) ǀ GTP(ignored)ǀ Payload |
| | GTP_c | IP (20) ǀ UDP (8) ǀ GTP (12) ǀ Payload |
| | GTP_u | IP (20) ǀ UDP (8) ǀ GTP (12) ǀ Payload |
| | Point to point protocol (PPP) (GTP with pre-defined TEID value) | IP (20) ǀ UDP (8) ǀ GTP (12) ǀ PPP ǀ Payload |

The above Table 1 specifically lists the types and formats of the packets applied to a Universal Mobile Telecommunication System (UMTS).

The UMTS enables multimedia data transmission and reception through mobile devices having IP addresses, and employs a Home Agent (HA) for managing the mobile devices in a corresponding range, and a Foreign Agent (FA)

for readjusting a data reception route according to the relocation of the mobile devices.

Figure 1:
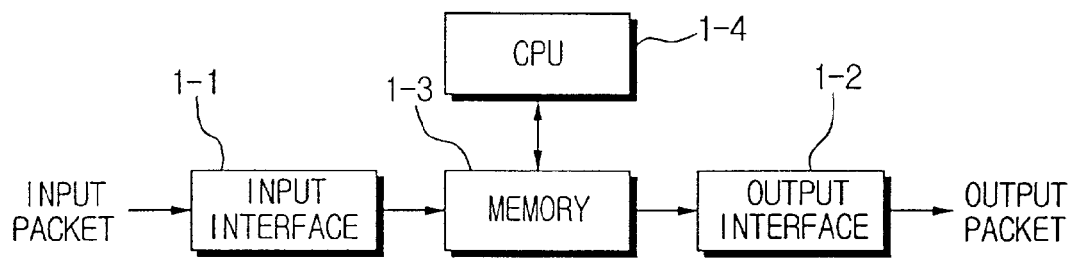
FIG. 1 is a view for explaining a conventional packet processing.
Figure 2:
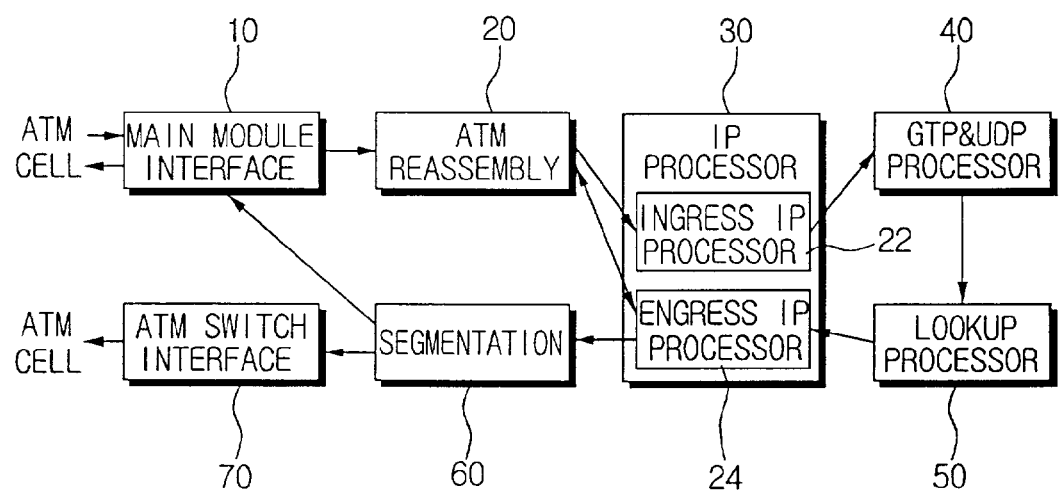
FIG. 2 is a block diagram showing a multi-layered packet processing device for an ATM transfer method, according to the present invention.

When the packet is transferred while being encapsulated in the ATM AAL5, as shown in the Table 1, the structure shown in FIG. 2 handles the packet at a hardware level. FIG. 2 shows the structure of a main module interface 10, an ATM reassembly 20, an ingress IP processor 22, a GTP (GPRS Tunnel Protocol) and UDP (User Datagram Protocol) processor 40, a lookup processor 50, an engress IP processor 24, a segmentation 60, and an ATM switch interface 70, all of which are connected in a pipelined structure.

The ATM reassembly 20 reassembles the ATM cells input through the main module interface 10 into a packet, and adds a tag to an area of the reassembled packet which is prepared for an attachment of the header, and outputs the reassembled packet as a first packet (P1).

The ingress IP processor 22 analyzes an IP header of the first packet (P1) which is output from the ATM reassembly 20. When the destination address matches the system address, the ingress IP processor 22 excludes the IP header and outputs the packet as a second packet (P2) to the GTP and UDP processor 40. When the destination address and the system address do not match each other, the ingress IP processor 22 outputs the first packet (P1) together with a bypass signal.

Upon receipt of the first packet (P1) with the bypass signal, the GTP and UDP processor 40 transfers the first packet (P1) to the lookup processor 50 without processing. Meanwhile, upon receipt of the second packet (P2), the GTP and UDP processor 40 checks a port number of the UDP header. If the second packet (P2) is determined to be a GTP packet as a result of checking the GTP header message type and Tunnel End Point ID (TEID), the GTP and UDP processor 40 looks up a valid index value and writes the valid index value in the tag, and outputs the packet as a third packet (P3) together with a lookup bypass signal. In this situation, a UDP header is not transferred.

Upon receipt of the third packet (P3) together with the bypass signal, the lookup processor 50 bypasses the signal without processing. Meanwhile, if the first packet (P1) is received, since it means the destination address of the received packet does not match the system address, the lookup processor 50 routes the destination address, and outputs a first packet (P1) updated with a destination address.

Upon receipt of either the first packet (P1) updated with the destination address, or the third packet (P3) having the valid index value written in its tag, the engress IP processor 24 requests a remainder of a payload which is temporarily stored in the ATM reassembly 20, and outputs the remainder of the payload to the segmentation 60, after either the first packet (P1) updated with the destination address is output, or after the third packet (P3) having the valid index value written in its tag is output.

When the remainder of the payload is received from the engress IP processor 24, together with the first packet (P1) updated with the destination address, the segmentation 60 looks up an appropriate VPI/VCI value, segments the first packet (P1) into the ATM cells, and outputs the ATM cells to the main module interface 10. When the remainder of the payload is received together with the third packet (P3) having the valid index value written in its tag, the segmentation 60 segments the third packet (P3) into the ATM cells, and outputs the ATM cells with the tag to the ATM switch interface 70.

Figure 3:
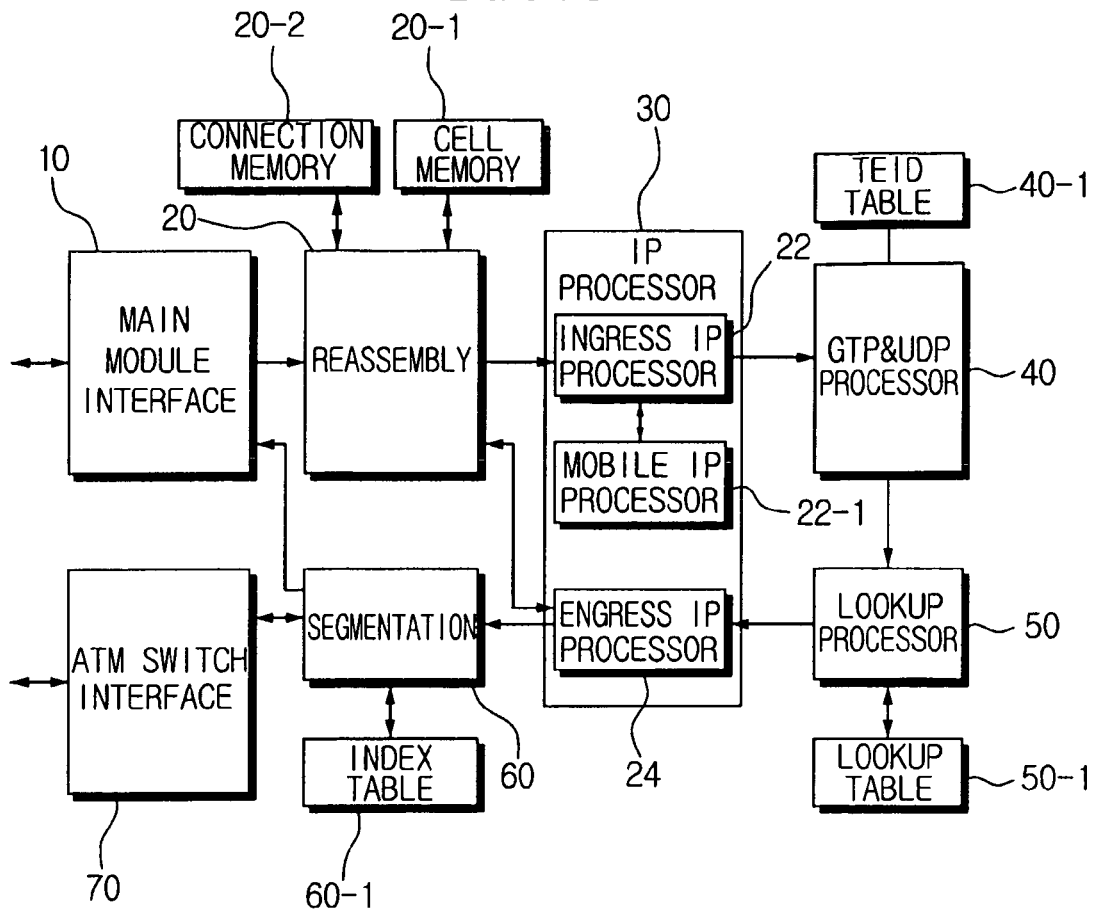
FIG. 3 is a block diagram showing a device added to the devices shown in FIG. 2.

Here, the ATM reassembly 20 has two memory blocks, i.e., a connection memory 20-2 and a cell memory 20-1, as shown in FIG. 3. The cell memory 20-1 stores a remainder of the packet that is separated from the ATM reassembly 20. The GTP and UDP processor 40 has a TEID lookup table 40-1. The lookup processor 50 has an IP address lookup table 50-1. The segmentation 60 has an index table 60-1. The whole structure of the packet processing device is shown in FIG. 3.

Figure 4A:
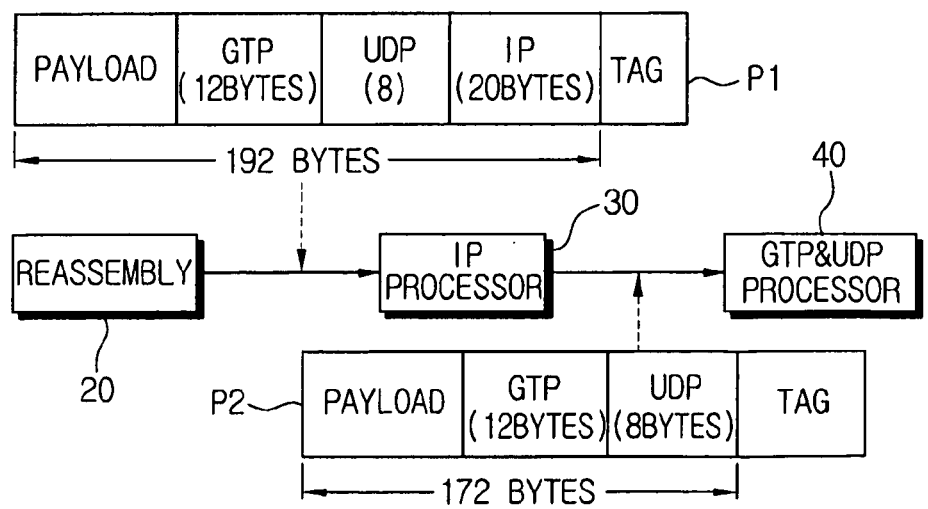
FIG. 4A is a partial block diagram for explaining an operation of the IP processor of FIG. 3.

The operation of the IP processor will be described with reference to FIGS. 3, 4A, and 4B.

Among the ATM cells transferred from the ATM reassembly 20 and through the main module interface 10, the first four (4) ATM cells, from which the headers are removed, are added to each other as data of 192 bytes. Then, added with the tag, the data of 192 bytes is transferred to the IP processor 30 as the first packet (P1), and accordingly, the IP processor 30 receives the first packet (P1) (step S1). The IP processor 30 checks the IP header, and checks whether the IP destination address matches the address of the IP processor 30 (step S2). Meanwhile, the first packet (P1) is structured whereby the tag is at the beginning, followed by an IP 80, a UDP 8, a GTP 12, and the first part of the payload. When the addresses do not match each other, since the UDP 8 and the GTP 12 do not need to be processed, the IP processor 30 transfers the GTP_bypass signal to the GTP and UDP processor 40, together with the first packet (P1) (step S2-2). In this situation, the GTP and UDP processor 40 bypasses the first packet (P1) to the lookup processor 50 without processing. Meanwhile, when it is determined by the IP processor 30 that the addresses match each other, an IP header-removed second packet (P2) is transferred to the GTP and UDP processor 40 (step S3).

If the mobile IP packet is transferred, the mobile IP processor 22-1 analyzes the encapsulation type of the packet, and performs a decapsulation, according to the analyzed result. After decapsulating an outer IP header and checking on the encapsulated IP header, the packet is transferred to the next processor, i.e., the GTP and UDP processor 40 (step S3). Here, since the GTP and UDP processor 40 does not need to analyze the mobile IP packet, the packet is transferred together with the bypass signal.

Figure 5A:
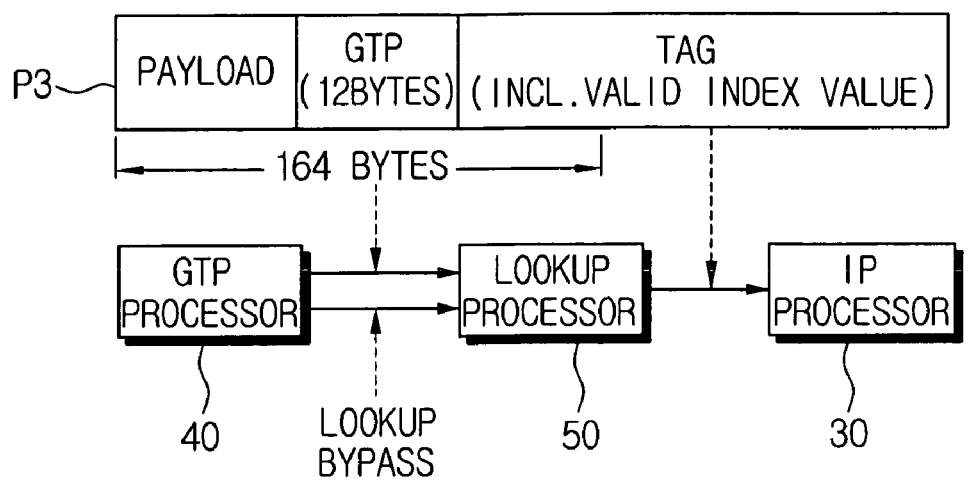
FIG. 5A is a partial block diagram for explaining the operation of the GTP and UDP processors of FIG. 3.
Figure 5B:
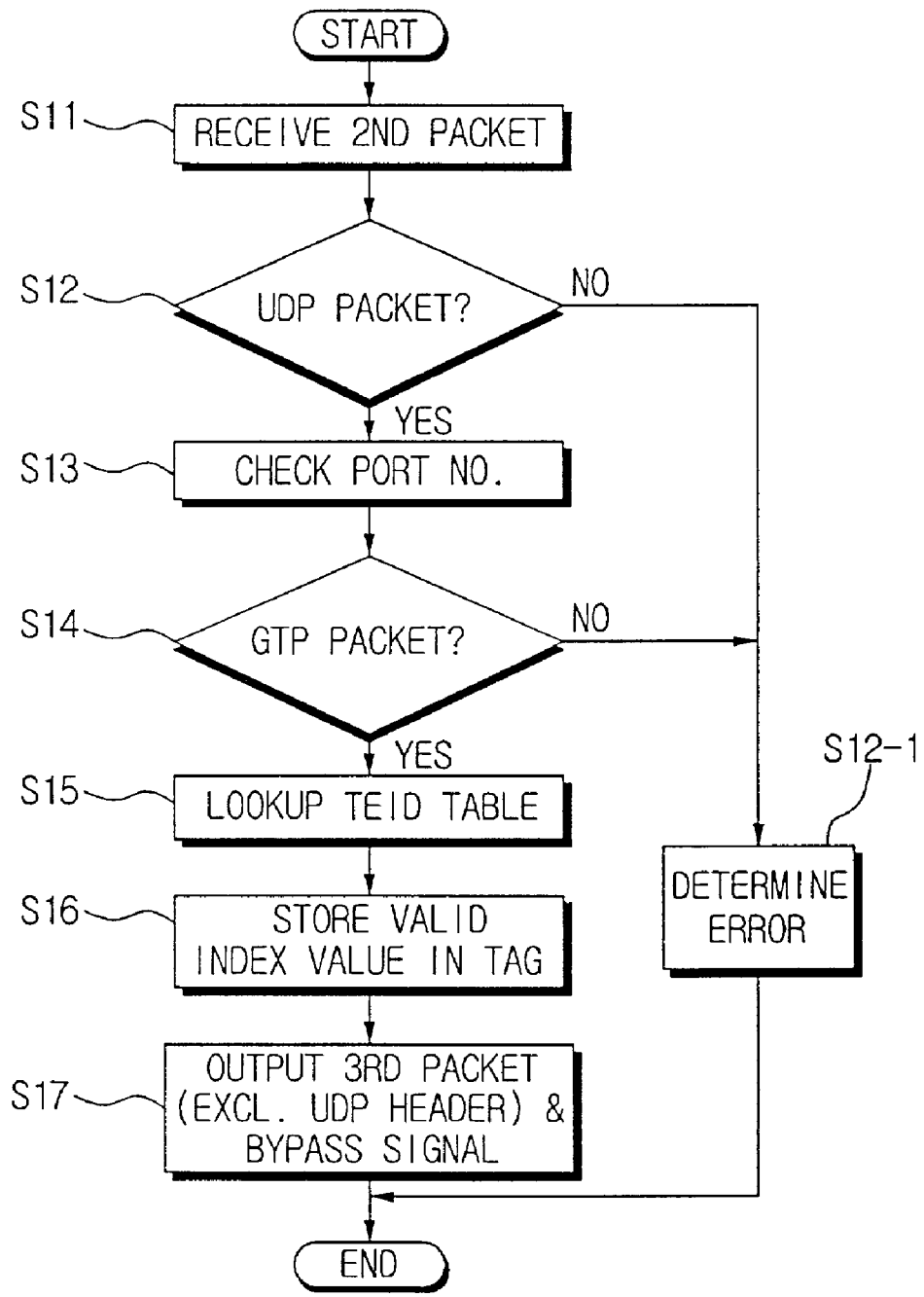
FIG. 5B is a flow chart for explaining the operation of the GTP and the UDP processors.

Referring to FIGS. 5A and 5B, upon receipt of the second packet (P2) from the IP processor 30 (step S11), the GTP and UDP processor 40 checks if the packet is the UDP packet (step S12). If the packet is a GGSN (Gateway GSN) _outgoing and if the destination address matches the system address, the packet always has the IP/UDP/GTP format. Accordingly, if the packet is not a UDP packet, the packet is determined to have an error (step S12-1). If the packet is determined to be a UDP packet, the port number is checked (step S13). Then, it is determined whether the packet is a GTP packet or not (step S14). If the packet is not a GTP packet, the packet is determined to have an error (step S12-1). If the packet is determined to be a GTP packet, then the GTP and UDP processor 40 looks up the TEID table 40-1 (step S15) for a valid index value. Whether the packet is a GTP packet or not is determined by checking the message type of the GTP header and the TEID field, based on whether the message type is 255 or not. The valid index value looked up from the TEID lookup table 40-1 is written in the tag of the second packet (P2) (step S16), and an UDP header-removed third packet (P3) is output to the lookup processor 50 together with the lookup bypass signal (step S17).

Accordingly, since the lookup processor 50 is not assigned to any job, as shown in FIG. 5A, according to the lookup bypass signal, the lookup processor 50 bypasses the third packet (P3) to the IP processor 30 without any processing. Meanwhile, when the lookup processor 50 receives the first packet (P1), since the destination address of the received first packet (P1) does not match the system address, the lookup processor 50 looks up an appropriate destination address in the lookup table 50-1, updates the destination address, and outputs the updated first packet (P1) to the IP processor 30.

When the lookup processor 50 looks up the mobile IP packets, the lookup processor 50 does not support a longest-prefix match lookup, based on the Classless Inter-Domain Routing (CIDR), but does support an exact match lookup, which outputs a result only on an exact match occasion. Here, the exact match is required since mobile nodes within the UMTS network do not have topology-based prefixes.

Figure 6:
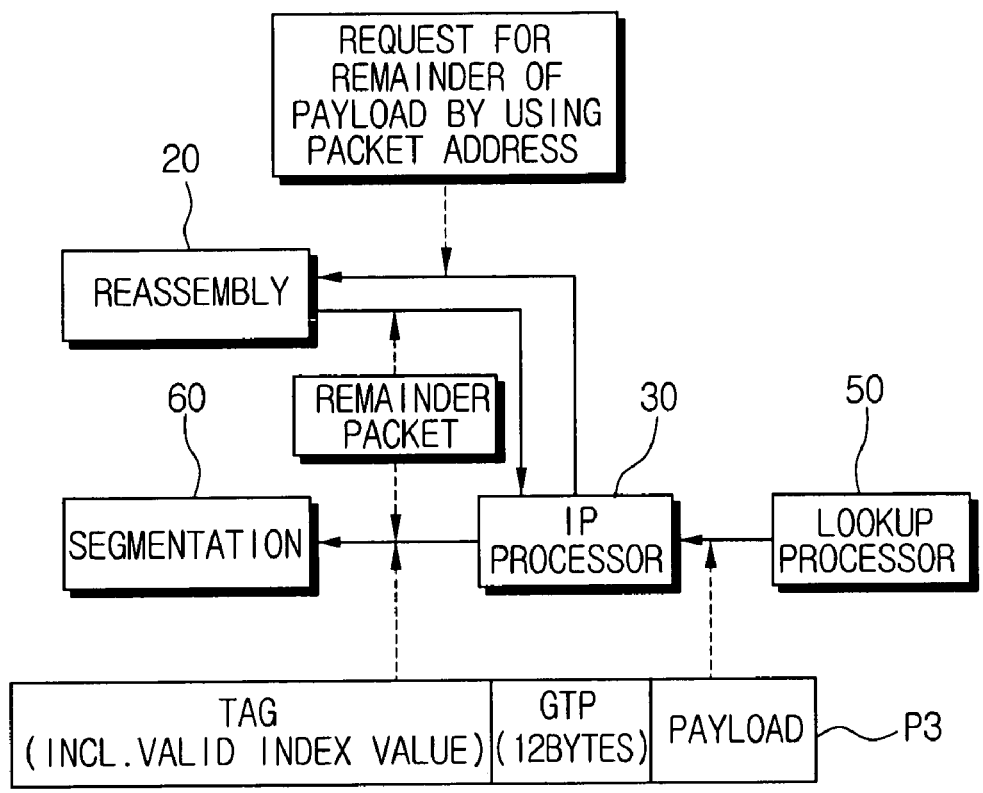
FIG. 6 is a partial block diagram for explaining an operation of the IP processor of FIG. 3.

Referring back to the FIGS. 4B and 6, the operation of the IP processor 30 will be described. When the engress IP processor 24 receives the third packet (P3) from the lookup processor 50 (step S4), the engress IP processor 24 checks whether the valid index value of the tag is set or not. When the valid index value of the tag is not set, the engress IP processor 24 requests from the ATM reassembly 20, the remainder of the third packet (P3), by using the packet address field (step S5). When it is determined that the remainder of the third packet (P3) has been received (step S6), the third packet (P3) is transferred to the segmentation 60, and the remainder of the third packet (P3), which is requested by the engress IP processor 24, is successively output to the segmentation 60, upon arrival to the engress IP processor 24 (step S7). The other Start Of Packets (SOP) are not transferred to the segmentation 60 until the remainder of the third packet (P3) is completely transferred to the segmentation 60.

When the segmentation 60 receives the third packet (P3) having a valid index value written in its tag together with the remainder of the payload, the segmentation 60 outputs the tag-included ATM cells to the ATM switch interface 70. When the segmentation 60 receives the first packet (P1) updated with the destination address and the remainder of the payload, the segmentation 60 looks up an appropriate VPI/VCI value, segments the first packet (P1) into the ATM cells, and outputs the ATM cells to the interface 10.

Further, the packet processing device, according to the present invention, recovers the original IP header if the received packet was an encapsulated mobile IP packet. The packet processing device updates the IP header if the system was the packet's intermediate node to the final destination.

As described above, in the pipelined structure of the multiple processors for performing various functions, since the packet is transferred from one processor to the next processor without a processed header, the packet handling can be performed more efficiently. Further, by dividing the function module for sequentially processing the packet, more packets can be processed simultaneously, and accordingly, data processing efficiency can be improved.

Accordingly, by using multiple processors in a pipelined structure for handling a received multi-layered packet, the packet can be processed fast at a hardware level.

As stated above, a preferred embodiment of the present invention is shown and described. Although the preferred embodiment of the present invention has been described, it is understood that the present invention should not be limited to this preferred embodiment, but various changes and modifications can be made by one skilled in the art within the spirit and scope of the present invention, as hereinafter claimed.

What is claimed is:

1. A multi-layered packet processing device, comprising:
   an interface of a public network for transmitting a data packet to a node and receiving the data packet from the node through a public network; and
   a plurality of packet processing portions for sequentially processing the data packet in a pipeline pattern, according to a header of the data packet transferred from the interface of the public network, wherein the plurality of packet processing portions comprise:
   a packet separating processor for outputting a packet to be analyzed, by sequentially including a tag in part of the data packet transferred from the interface, the packet separating processor for storing a remainder of the packet to be analyzed, which is left after the packet to be analyzed is output;
   a plurality of header analyzing processors for sequentially analyzing the packet to be analyzed transferred from the packet separating processor, according to a header encapsulated in the packet to be analyzed, and then reflecting an analyzed result in the tag of the packet to be analyzed, and outputting an analyzed packet;
   a packet reassembling processor for requesting the remainder of the packet to be analyzed stored in the packet separating processor, when the packet reassembling processor receives the analyzed packet output from the plurality of header analyzing processors, and outputting the analyzed packet together with the requested remainder of the packet to be analyzed, as a complete data packet; and
   an output processor for determining an output route of the complete data packet by analyzing output route information reflected in the tag of the complete data packet transferred from the packet reassembling processor, and outputting the complete data packet according to the determined output route.

2. The multi-layered packet processing device of claim 1, wherein the packet separating processor reassembles asynchronous transfer mode (ATM) cells transferred from the interface.

3. The multi-layered packet processing device of claim 2, wherein the output processor segments the complete data packet transferred from the packet reassembling processor into the ATM cells, and outputs the ATM cells.

4. The multi-layered packet processing device of claim 1, wherein the plurality of header analyzing processors comprise:
   an internet protocol (IP) header analyzing processor for determining whether a destination address of the packet to be analyzed matches a system address, and outputting an IP header-removed first packet when the destination address of the packet to be analyzed matches the system address;
   a protocol transmission type header analyzing processor for analyzing a protocol transmission type header of the IP header-removed first packet, reflecting the analyzed result in the tag of the packet to be analyzed, and outputting a second packet from which the protocol transmission type header is removed; and
   a lookup processor for updating the destination address of the packet to be analyzed, which is transferred from the protocol transmission type header analyzing processor, outputting an updated packet to be analyzed to the packet reassembling processor, and outputting the second packet, which is transferred from the protocol transmission type header analyzing processor, together with a bypass signal, without processing.

5. A multi-layered packet processing device, comprising:
an interface of a public network for transmitting a data packet to a node and receiving the data packet from the node through a public network; and
a plurality of packet processing portions for sequentially processing the data packet in a pipeline pattern, according to a header of the data packet transferred from the interface of the public network, wherein the plurality of packet processing portions comprise:
a packet separating processor for outputting a packet to be analyzed;
a plurality of header analyzing processors for sequentially analyzing the packet to be analyzed transferred from the packet separating processor, according to a header encapsulated in the packet to be analyzed, and then reflecting an analyzed result in the tag of the packet to be analyzed, and outputting an analyzed packet;
a packet reassembling processor for requesting the remainder of the packet to be analyzed stored in the packet separating processor.

6. A multi-layered packet processing device, comprising:
an interface of a public network for transmitting a data packet to a node and receiving the data packet from the node through a public network; and
a plurality of packet processing portions for sequentially processing the data packet in a pipeline pattern, according to a header of the data packet transferred from the interface of the public network, wherein the plurality of packet processing portions further comprise:
an output processor for determining an output route of a complete data packet by analyzing output route information reflected in the tag of the complete data packet transferred from the packet reassembling processor, and outputting the complete data packet according to the determined output route, wherein
the packet reassembling processor requests the remainder of the packet to be analyzed stored in the packet separating processor, when the packet reassembling processor receives the analyzed packet output from the plurality of header analyzing processors, and outputs the analyzed packet together with the requested remainder of the packet to be analyzed, as the complete data packet.

* * * * *